(12) United States Patent
Ho

(10) Patent No.: US 10,561,212 B2
(45) Date of Patent: *Feb. 18, 2020

(54) CARRYING BAG WITH PLACEMENT RACK

(71) Applicant: Oxti Corporation, Taipei (TW)

(72) Inventor: Chih Feng Ho, Taipei (TW)

(73) Assignee: Zgonic Pty Ltd., Port Melbourne, Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,486

(22) Filed: Jul. 6, 2018

(65) Prior Publication Data
US 2020/0008546 A1 Jan. 9, 2020

(51) Int. Cl.
*A45C 9/00* (2006.01)
*A45C 13/02* (2006.01)
*H02J 7/00* (2006.01)
*G06F 1/16* (2006.01)

(52) U.S. Cl.
CPC ............... *A45C 9/00* (2013.01); *A45C 13/02* (2013.01); *G06F 1/1637* (2013.01); *G06F 1/1656* (2013.01); *H02J 7/0042* (2013.01); *A45C 2013/025* (2013.01); *G06F 1/1681* (2013.01)

(58) Field of Classification Search
CPC .. A45C 5/14; A45C 9/00; A45C 13/00; A45C 13/02; A45C 13/26; A45C 13/28; A45C 15/00; A45C 2013/025; G06F 1/16; G06F 1/1637; G06F 1/1656; G06F 1/1681; H02J 7/00; H02J 7/0042
USPC ....................................................... 206/320
See application file for complete search history.

(56) References Cited

U.S. PATENT DOCUMENTS

| | | | | |
|---|---|---|---|---|
| 6,145,661 A * | 11/2000 | Jung | ...................... | A45C 13/02 206/320 |
| 6,149,001 A * | 11/2000 | Akins | .................... | A45C 13/26 206/320 |
| 9,936,781 B2 * | 4/2018 | Lindholm | .............. | A45C 11/00 |
| 10,334,928 B1 * | 7/2019 | Ho | ........ | A45C 15/00 |
| 2005/0206615 A1 * | 9/2005 | Tanimoto | .............. | G06F 1/1616 361/679.27 |
| 2006/0007645 A1 * | 1/2006 | Chen | ..................... | G06F 1/1626 361/679.04 |
| 2007/0205122 A1 * | 9/2007 | Oda | ..................... | H04M 1/0216 206/320 |
| 2008/0202959 A1 * | 8/2008 | Chu | ....................... | G06F 1/1628 206/320 |
| 2011/0233912 A1 * | 9/2011 | Reising | .................. | A45C 11/00 281/30 |
| 2013/0015088 A1 * | 1/2013 | Wu | ........................ | A45C 11/00 206/320 |

* cited by examiner

*Primary Examiner* — Bryon P Gehman
(74) *Attorney, Agent, or Firm* — Charles E. Baxley

(57) ABSTRACT

A carrying bag includes a housing having a base wall and an upper wall, and the housing includes a cover panel foldable relative to the upper wall, a base plate is engaged in the housing, a support device is foldably attached to the base plate with a hinge device, and the support device is foldable relative to the base plate and the housing, and a display is attached to the support device and movable relative to the upper wall between an upwardly working position and a downwardly folded storing position. The housing includes a chamber for receiving a mobile device. An attachment is attached to the support device for engaging with and for supporting a mobile member.

9 Claims, 4 Drawing Sheets

CARRYING BAG WITH PLACEMENT RACK

BACKGROUND OF THE INVENTION

1. Field of the Invention

The present invention relates to a package or carrying bag for displayer or mobile device, and more particularly to a package or carrying bag for accommodating or receiving a displayer or a mobile device, such as a tablet, a laptop, a screen, a notebook, etc., including an improved supporting shelf or placement rack for accommodating or receiving the displayer or the screen or the mobile device or the like.

2. Description of the Prior Art

Typical mobile devices, such as tablets, screens, laptops, notebooks, etc., may normally be accommodated or received or contained within a fold or package which comprises a base and a cover foldable relative to each other.

However, the fold or package may not be used for accommodating or receiving the other displayers or mobile devices or the like.

The present invention has arisen to mitigate and/or obviate the afore-described disadvantages of the conventional carrying bag for mobile devices.

SUMMARY OF THE INVENTION

The primary objective of the present invention is to provide a package or carrying bag for accommodating or receiving a displayer or a mobile device, such as a tablet, a laptop, a screen, a notebook, etc., including an improved supporting shelf or placement rack for accommodating or receiving or supporting the displayer or the screen or the mobile device or the like.

In accordance with one aspect of the invention, there is provided a carrying bag comprising a housing including a base wall and an upper wall, and a cover panel extended from the upper wall and foldable relative to the upper wall and movable toward the upper wall, a base plate engaged in the housing, a placement rack or support device foldably attached to the base plate with a hinge device, and the support device being foldable relative to the base plate and the housing, a display attached to the support device and movable relative to the upper wall between an upwardly working position and a downwardly folded storing position, and an attachment attached to the support device or to the cover panel.

The attachment includes at least one groove formed therein, and the support device includes at least one guide pin slidably engaged in the at least one groove of the attachment for guiding and limiting the attachment to slide and move relative to the support device and the cover panel.

The attachment includes a lock element for engaging with a mobile member. The attachment includes a charger for selectively and electrically connecting to the mobile member and for charging the mobile member. The housing includes a depression formed in the upper wall for selectively receiving and engaging with the display when the cover panel is folded toward the upper wall.

The housing includes a chamber formed therein and defined by a base wall and the upper wall, a mobile device is selectively receiveable and engageable into the chamber of the housing. A connecting cable is connectable to the display and the mobile device.

The housing includes a flap extended from the base wall and foldable relative to the base wall for covering the chamber of the housing selectively, and the housing includes a lock device attached to the cover panel, and a lock member attached to the flap for selectively engaging with the lock device of the cover panel and for coupling the cover panel and the flap together.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
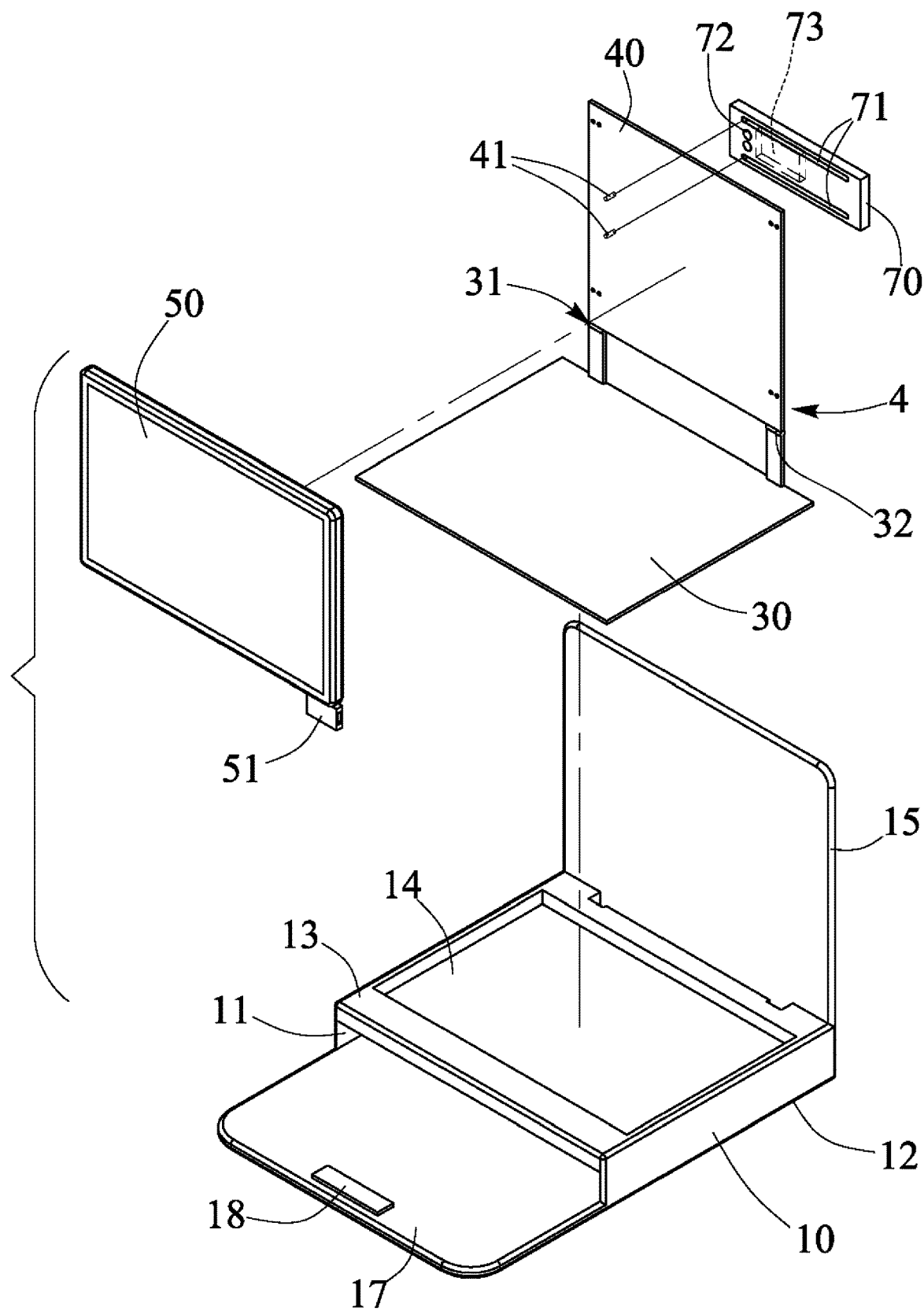
FIG. 1 is a partial exploded view of a carrying bag for mobile device in accordance with the present invention.
Figure 2:
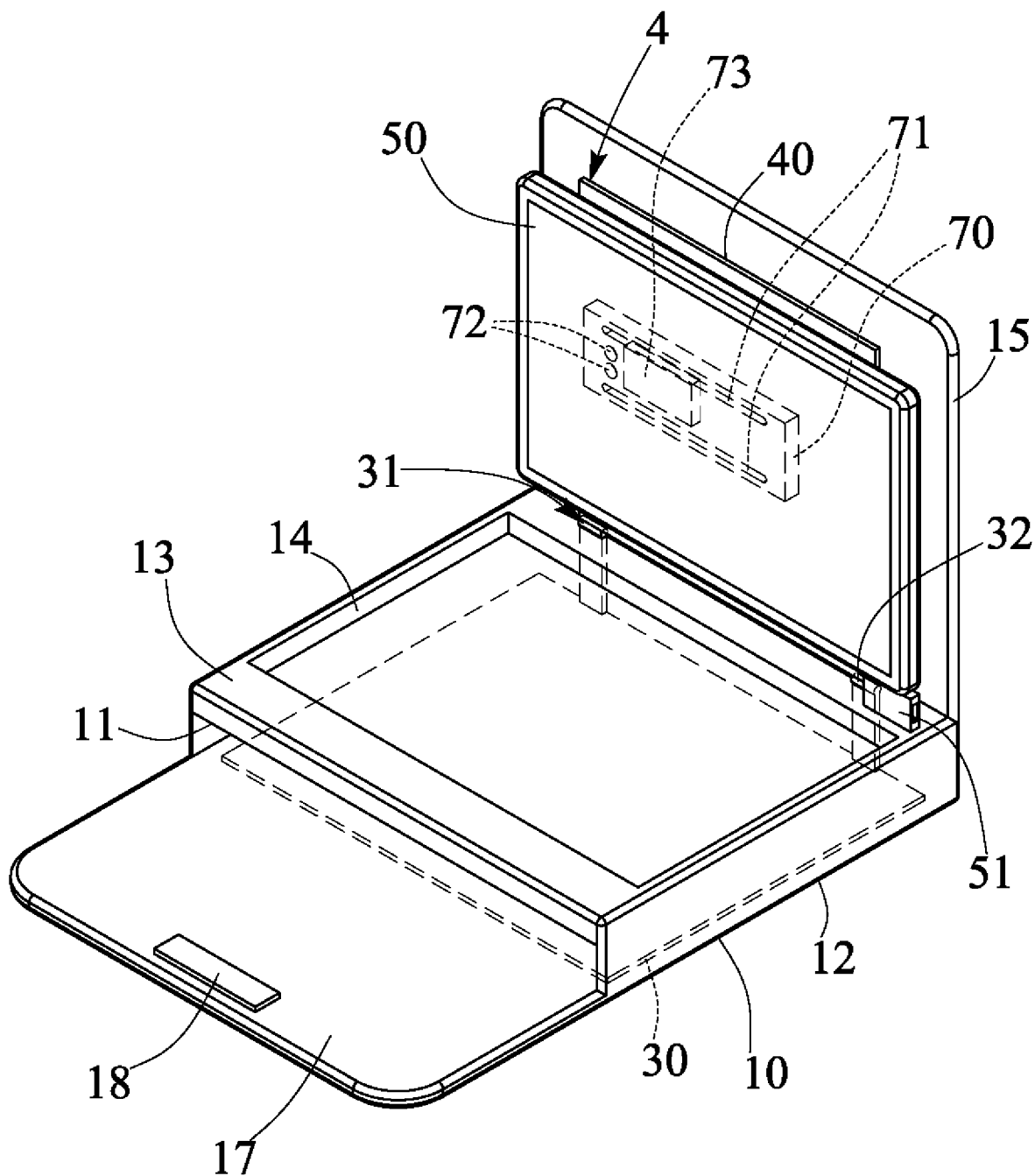
FIG. 2 is a perspective view illustrating the operation of the carrying bag for mobile device.

Referring to the drawings, and initially to FIGS. 1-5, a package or container or carrying bag for mobile device in accordance with the present invention comprises a carrying bag body or housing 10 including a compartment or chamber 11 formed therein and formed or defined by a bottom or base wall 12 and an upper wall 13, and including a recess or depression 14 formed in the upper wall 13, the depression 14 that is formed in the upper wall 13 may be communicated with or spaced or separated from the chamber 11 of the housing 10. The housing 10 includes a cover panel 15 hinged or extended from the base wall 12 and/or the upper wall 13 and foldable relative to the upper wall 13 and/or foldable or movable toward the upper wall 13 (FIGS. 3, 4) for covering the depression 14 of the upper wall 13 of the housing 10 selectively.

The housing 10 further includes a lock device 16 (FIG. 3), such as a Velcro, a magic sticker or the like attached or mounted or secured to the cover panel 15, and further includes another fold or flap 17 hinged or extended from the base wall 12 and foldable relative to the base wall 12 and/or the upper wall 13, for covering the chamber 11 of the housing 10 selectively. The housing 10 further includes another lock device or lock member 18, such as a Velcro, a magic sticker or the like attached or mounted or secured to the flap 17, for selectively engaging with the lock device 16 of the cover panel 15, and for solidly and stably securing or coupling the cover panel 15 and the flap 17 together. The chamber 11 of the housing 10 may be provided for accommodating or receiving or containing a mobile device 20 (FIGS. 4-6), such as a tablet, a laptop, a screen, a notebook, or the like.

As shown in FIGS. 1-4, a weight member of base plate 30 is received or engaged into the base wall 12 of the housing 10, and disposed or located below the chamber 11 of the housing 10, a placement rack or support device 4 is foldably attached or mounted or secured to the base plate 30 with a pivot or hinge device 31 and foldable relative to the base plate 30, for example, the support device 4 includes a stay or board or carrier 40 pivotly or foldably attached or mounted or secured to the base plate 30 with a hinge member 32 of the hinge device 31 and foldable relative to the base plate 30 (FIGS. 3, 4), the carrier 40 of the support device 4 are contacted or engaged or attached or mounted or secured to the cover panel 15 and foldable or movable in concert with the cover panel 15 relative to the base plate 30 and the base wall 12 and/or the upper wall 13.

A screen or display 50 is attached or mounted or secured to the carrier 40 of the support device 4 and foldable or movable relative to the base wall 12 and/or the upper wall 13 between an upwardly opening or working position as shown in FIGS. 2-6, and a downwardly folded storing position. It is preferable that the display 50 is received or engaged into the depression 14 of the upper wall 13 of the housing 10 when the cover panel 15 and the carrier 40 of the support device 4 are folded or moved toward the upper wall 13. When or after the mobile device 20 is received or engaged into the chamber 11 of the housing 10 and when the cover panel 15 and the carrier 40 of the support device 4 are folded or moved toward the upper wall 13, the flap 17 may be folded relative to the base wall 12 and/or the upper wall 13, and the lock member 18 of the flap 17 may be engaged with the lock device 16 of the cover panel 15, for solidly and stably securing or coupling the cover panel 15 and the flap 17 together and for solidly and stably anchoring or retaining the mobile device 20 within the chamber 11 of the housing 10.

Figure 5:
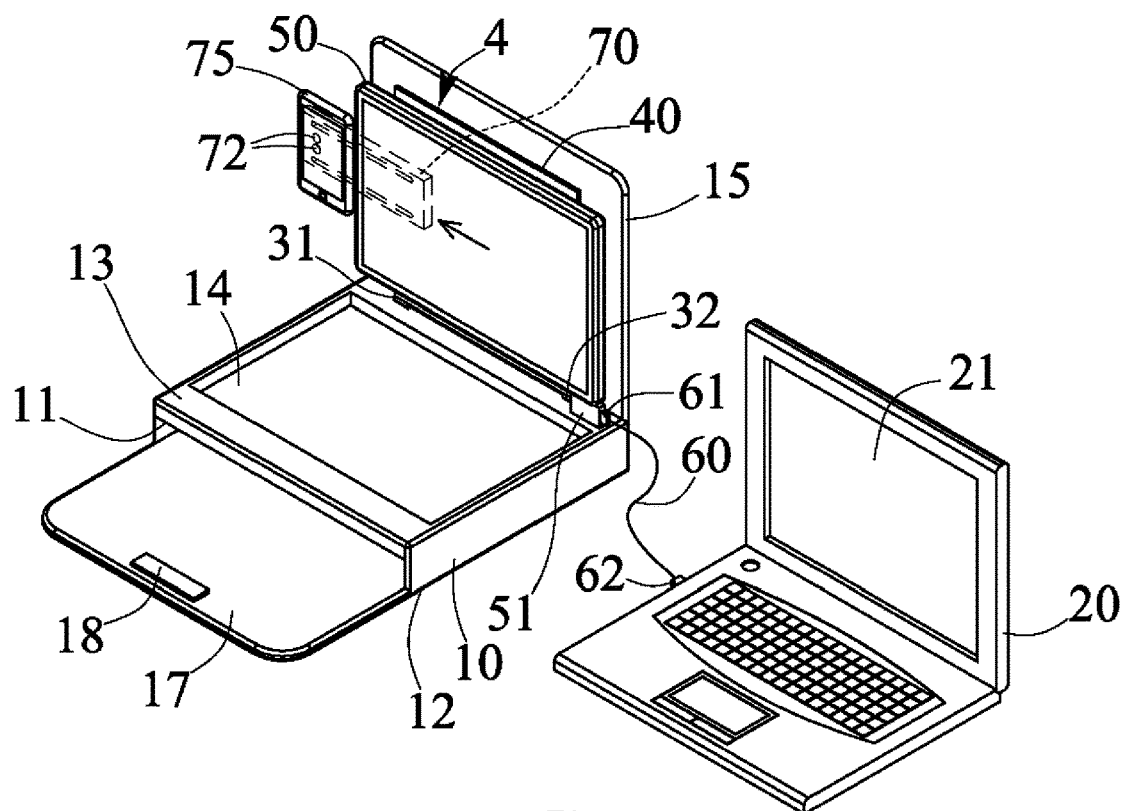
FIG. 5 is a further perspective view illustrating the operation of the carrying bag for mobile device.
Figure 6:
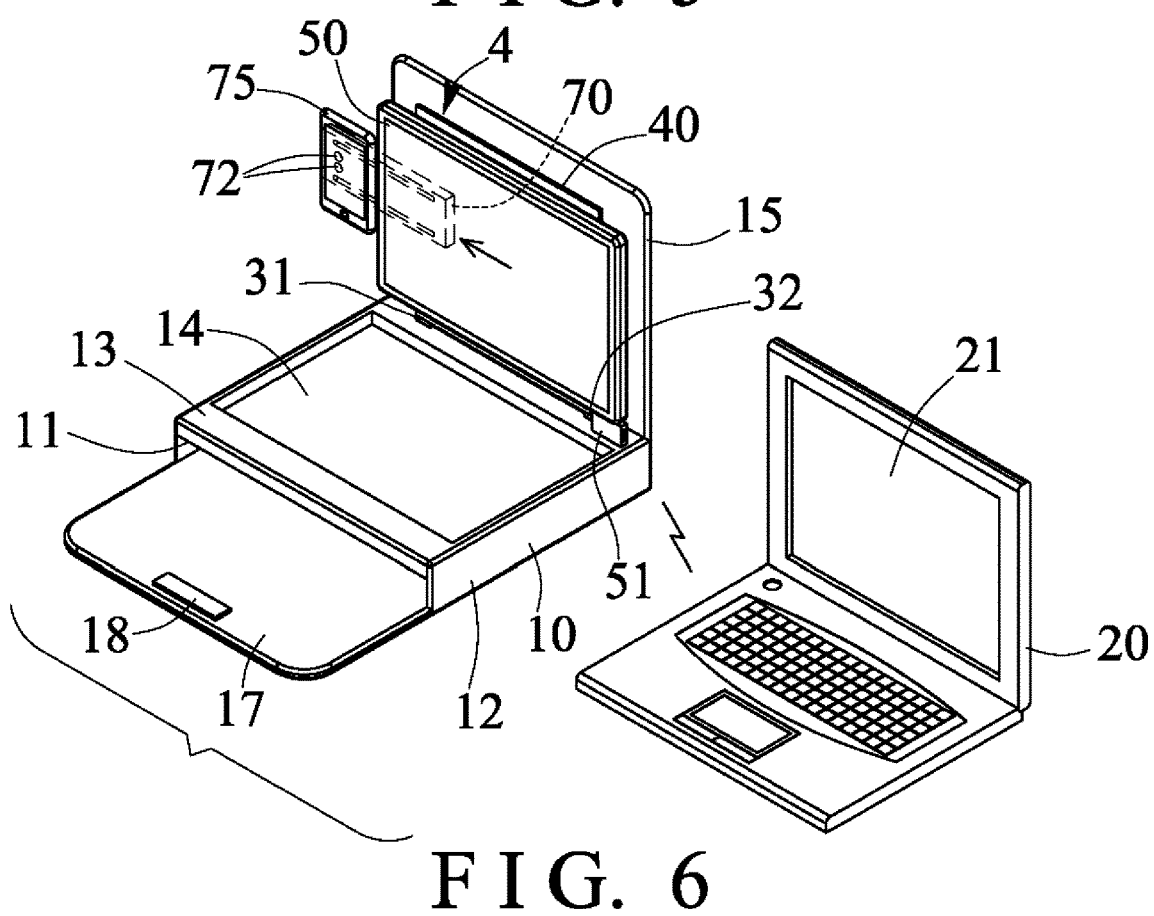
FIG. 6 is another partial exploded view illustrating the application of the carrying bag for mobile device.

As shown in FIG. 5, when the mobile device 20 is removed or disengaged from the chamber 11 of the housing 10, the mobile device 20 may be electrically connected or coupled to the terminal or connecter 51 of the display 50 with a connecting cable 60 and one or more connecters or couplers 61, 62, for allowing the information of the mobile device 20 to be shown in either or both the display 50 and the screen 21 of the mobile device 20. The connecter 51 of the display 50 may be selected from a USB type C connecter, a Miracast, an Airplay, an AiDi, a Chromecast, or a DLNA, or the like. Similarly, the mobile device 20 may also be electrically connected or coupled to the terminal or connecter 51 of the display 50 wirelessly, as shown in FIG. 6.

In operation, as shown in FIGS. 2-6, the display 50 and the cover panel 15 and the carrier 40 of the support device 4 may be folded relative to the base wall 12 and/or the upper wall 13 upwardly toward the opening or working position for allowing the display 50 reached or operated by the user. After use, the display 50 and the cover panel 15 and the carrier 40 of the support device 4 may be folded relative to the base wall 12 and/or the upper wall 13 downwardly toward the upper wall 13 to the folded storing position, for allowing the display 50 to be received or engaged into the depression 14 of the upper wall 13 of the housing 10. After the mobile device 20 is received or engaged into the chamber 11 of the housing 10, the flap 17 may be folded relative to the base wall 12 and/or the upper wall 13, and the lock member 18 of the flap 17 may be engaged with the lock device 16 of the cover panel 15, for solidly and stably securing or coupling the cover panel 15 and the flap 17 together and for solidly and stably anchoring or retaining the mobile device 20 within the chamber 11 of the housing 10.

Figure 3:
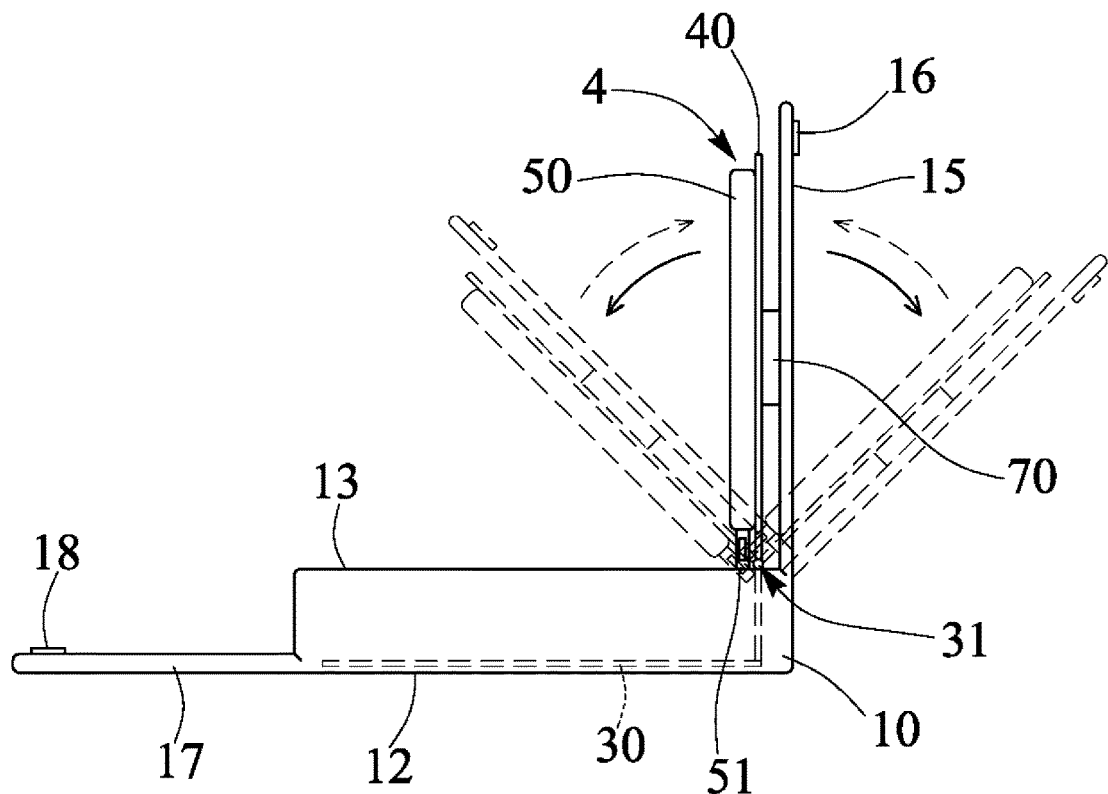
FIG. 3 is a side plan schematic view of the carrying bag for mobile device as shown in FIG. 2.
Figure 4:
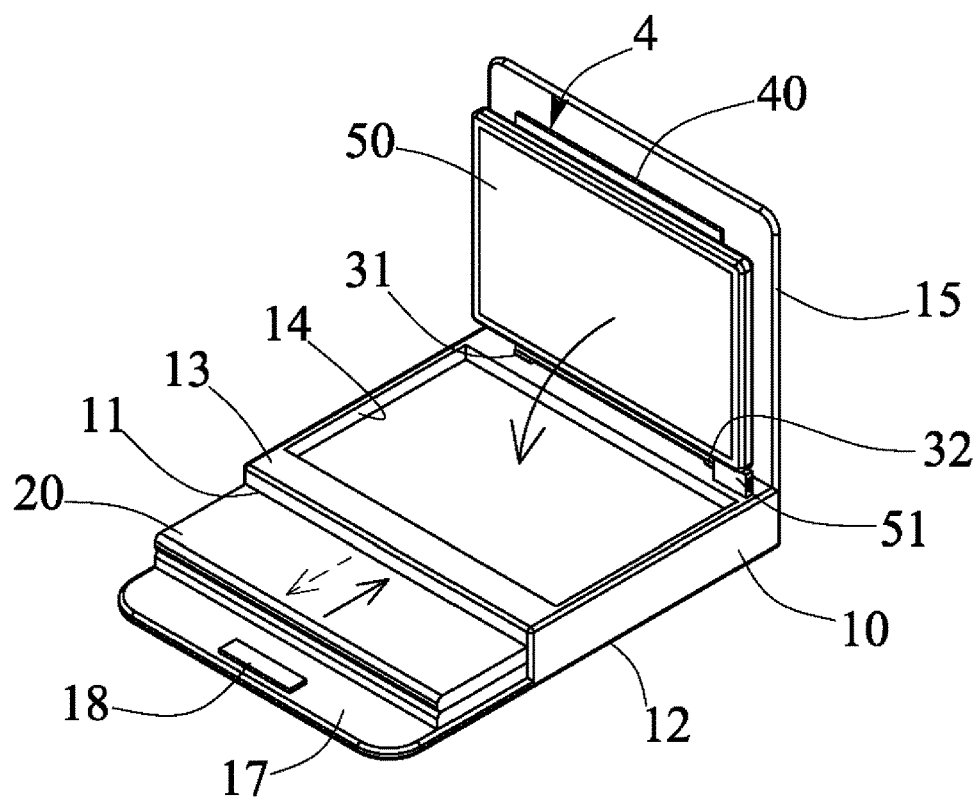
FIG. 4 is another perspective view similar to FIG. 2, illustrating the operation of the carrying bag for mobile device.

Another carrier or slide or attachment 70 is slidably received or engaged in or attached to the cover panel 15 or the carrier 40 of the support device 4, and/or slidably received or engaged between and/or attached to the carrier 40 and the cover panel 15 of the housing 10 (FIG. 3). For example, the attachment 70 includes one or more (such as two) oblong holes or grooves 71 formed therein and parallel to each other (FIGS. 1, 2), and the support device 4 includes one or more (such as two) pegs or guide pins 41 (FIG. 1) attached or mounted or secured to the carrier 40 and slidably received or engaged in the grooves 71 of the attachment 70 for guiding and limiting the attachment 70 to slide and move relative to the carrier 40 and the cover panel 15 and for preventing the attachment 70 from being disengaged or separated from the carrier 40 and the cover panel 15.

The attachment 70 further includes a further lock device or lock element 72, such as a lock, a Velcro, a magic sticker or the like attached or mounted or secured to the attachment 70, for selectively engaging with another mobile device or mobile member 75 (FIGS. 5-6), such as a tablet, a laptop, a screen, a notebook, a portable phone or the like and for solidly and stably securing or coupling the mobile member 75 to the cover panel 15 and/or the carrier 40 of the support device 4, and the attachment 70 may further include a charger 73 (FIGS. 1, 2), such as a wireless charger 73 disposed therein for selectively and electrically connecting or coupling to the mobile member 75 and for selectively charging the mobile member 75 wirelessly.

In operation, as shown in FIG. 5 or 6, the display 50 and the cover panel 15 and the carrier 40 of the support device 4 may be folded relative to the base wall 12 and/or the upper wall 13 upwardly toward the opening or working position for allowing the display 50 reached or operated by the user. In addition, while using or operating the display 50 and/or the mobile device 20, the mobile member 75 may also be reached or operated by the user easily and simultaneously.

Accordingly, the package or carrying bag for mobile device in accordance with the present invention includes an improved supporting shelf or placement rack for accommodating or receiving or supporting the displayer or the screen or the mobile device or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A carrying bag comprising:
    a housing including a base wall and an upper wall, and a cover panel extended from said upper wall and foldable relative to said upper wall and movable toward said upper wall,
    a base plate engaged in said housing,
    a support device foldably attached to said base plate with a hinge device, and said support device being foldable relative to said base plate and said housing,
    a display attached to said support device and movable relative to said upper wall between an upwardly working position and a downwardly folded storing position, and
    an attachment attached to said support device.

2. The carrying bag as claimed in claim 1, wherein said attachment includes at least one groove formed therein, and said support device includes at least one guide pin slidably engaged in said at least one groove of said attachment for guiding and limiting said attachment to slide and move relative to said support device and said cover panel.

3. The carrying bag as claimed in claim 1, wherein said attachment includes a lock element for engaging with a mobile member.

4. The carrying bag as claimed in claim 3, wherein said attachment includes a charger.

5. The carrying bag as claimed in claim 1, wherein said housing includes a chamber formed therein and defined by a base wall and said upper wall, a mobile device is selectively receiveable and engageable into said chamber of said housing.

6. The carrying bag as claimed in claim 5, wherein a connecting cable is connectable to said display and said mobile device.

7. The carrying bag as claimed in claim 5, wherein said housing includes a flap extended from said base wall and foldable relative to said base wall for covering said chamber of said housing selectively, and said housing includes a lock device attached to said cover panel, and a lock member attached to said flap for selectively engaging with said lock device of said cover panel and for coupling said cover panel and said flap together.

8. The carrying bag as claimed in claim 1, wherein said housing includes a depression formed in said upper wall for selectively receiving and engaging with said display when said cover panel is folded toward said upper wall.

9. A carrying bag comprising:
- a housing including a base wall and an upper wall, and a cover panel extended from said upper wall and foldable relative to said upper wall and movable toward said upper wall,
- a base plate engaged in said housing,
- a support device foldably attached to said base plate with a hinge device, and said support device being foldable relative to said base plate and said housing,
- a display attached to said support device and movable relative to said upper wall between an upwardly working position and a downwardly folded storing position, and
- an attachment attached to said cover panel.

* * * * *